2,802,792
ELECTROLUMINESCENT PHOSPHORS

Keith H. Butler, Marblehead, and Laurence Burns, Swampscott, Mass., assignors to Sylvania Electric Products Inc., Salem, Mass., a corporation of Massachusetts No Drawing. Application April 13, 1953, Serial No. 348,574

9 Claims. (Cl. 252—301.6)

This invention relates to electroluminescent phosphors, that is to phosphors which will luminesce when placed in an electric field.

Phosphors of that type comprising zinc sulphide activated by copper and lead have been previously known. We have now discovered that the lead can be replaced in whole or in part by arsenic, antimony, or bismuth with excellent results.

The elements mentioned can be added in suitable salts to the zinc sulfide already containing a copper activator. The phosphor will be fluorescent before the antimony, bismuth, or arsenic is added, but will not be electroluminescent; the addition of the latter material will make it brightly electroluminescent.

The material can be prepared by prefiring a fluorescent material containing copper in rather large amounts and also a co-activator, such as a halide or a trivalent metal. This prefired material is then mixed with a compound of arsenic, antimony, or bismuth and then fired again to give a phosphor showing electroluminescence.

In one embodiment of the invention, 450 grams of phosphor-grade zinc sulfide containing approximately 3% combined water and also about 2% chloride (present either as zinc chloride or ammonium chloride) was mixed with 20 grams of zinc oxide, 25 grams of basic magnesium carbonate, and 0.66 grams of copper carbonate. The amount of copper in this mixture can be expressed as 0.0012 gram-atoms of copper per mole of zinc sulfide. The magnesium carbonate improved the physical characteristics of the phosphor powder, but was not necessary to its luminescence. The components were intimately mixed by rolling in a gallon bottle after which they were hammermilled and rerolled for two hours. The blend was placed in 150 cc. porcelain crucibles, provided with covers. The covered crucibles were placed in a furnace at 1600° F. and fired for two hours. At the end of the firing time, the crucibles were removed and allowed to cool before removing the covers.

The fluorescent powder so prepared showed excellent green fluorescence but no electroluminescence. 25 grams of this fired powder were then mixed, by grinding in a mortar, with 0.01 grams of bismuth trioxide. After the mortar grinding, the sample was placed in a glass bottle and mixed by rolling for one-half hour. The mixture was then placed in a 40 cc. porcelain crucible, provided with a cover, and fired for one hour at 1600° F. The powder as removed from the furnace had a slight skin of zinc oxide on the surface and below this a skin of a dark material; both of these were carefully removed and the remainder of the powder was mortar-ground. The ground powder was then subjected to a treatment with hot dilute acetic acid, as described in co-pending application Serial No. 230,711, filed June 8, 1951 by Keith H. Butler. In that treatment, the phosphor is boiled with a hot 5% aqueous solution of acetic acid, dissolving away most of the free zinc oxide. The mixture is filtered and washed on the filter with two portions of an aqueous ½% acetic acid solution, and then washed twice with distilled water.

The electroluminescent light output of the phosphor was tested by grinding together 1.2 grams of phosphor and 1.0 cc. of castor oil. A portion of the paste was placed on a metal plate 1½ inches square and a piece of conducting glass pressed down so as to leave a film exactly 0.005 inches thick. This thickness was determined by the use of suitable spacers. A 60 cycle source of alternating current power was attached to the metal plate and to the conducting glass so as to apply a voltage between the plate and the glass and the light output was measured with a photomultiplier tube. In addition to this measurement, other measurements were made with blue and yellow glass filters placed over the luminescent portion. The brightness, measured in arbitrary units, was 2,200 and the current through the film was 550 microamperes. The reading through the blue filter was 0.80 of that through the yellow filter and this was called the color ratio of the sample.

The results obtained with a number of variations in the method of preparation will be described below, but it should be noted here that we find the initial firing, before the addition of the activating oxide, is not at all critical and may be varied from a time of a few minutes up to several hours at a temperature between about 1450 and 1750° F. The size of the crucibles used is also unimportant for the initial firing, although 150 cc. was the size used. While we prefer to use oxides of the activating metals such as, antimony tetroxide, bismuth trioxide, or arsenic pentoxide, many other compounds of these metals can be used with equally good results, for example, the chlorides, carbonates and sulfides. We have found the copper content to be quite important, as shown in the tables below, but copper concentrations between 0.004 to 0.0050 atom of copper per mole of zinc sulfide give good electroluminescent materials.

We have found that the amount of the second activating metal, namely, antimony, arsenic, or bismuth should be kept within certain limits, so that only a small range of concentrations can be used satisfactorily. The allowable range varies with the particular metal used as an activator.

Table I below shows the results obtained with additions of antimony oxide to a phosphor containing 0.0008 atoms of copper per mole of zinc sulfide for powders refined at 1600° F. In this case, the allowable range of antimony is relatively large and we have found that any amount from approximately 0.02% by weight up to 2% by weight gives good electroluminescent phosphors. We believe that the range of antimony oxide additions is large because excess oxide acts as merely a diluent and does not give the phosphor too high a conductivity, such as is obtained with correspondingly large amounts of lead or bismuth.

TABLE I

Effect of antimony oxide additions on powders containing 0.0008 atoms of copper per mole ZnS

| Percent by Weight of $Sb_2O_4$ | Brightness (Arbitrary Units) | Current Microamperes | Color Ratio |
|---|---|---|---|
| 0.00 | less than 10 | 90 | |
| 0.04 | 1,500 | 200 | 1.48 |
| 0.08 | 1,500 | 200 | 1.52 |
| 0.16 | 1,400 | 190 | 1.60 |
| 0.20 | 1,200 | 170 | 1.25 |
| 0.80 | 1,100 | 190 | 1.25 |
| 1.60 | 1,100 | 170 | 1.37 |

Table II below shows the effect of copper concentration used in the original fluorescent powder. It will be seen that phosphors with copper contents above 0.0004 atoms per mole of zinc sulfide give good electroluminescent material. In fact, we have found that slightly less copper than this amount will still give electroluminescent materials. The phosphors low in copper tend to show blue electroluminescence as indicated in the table by a high value for the color ratio, while those with large amounts of copper show green electroluminescence as indicated by a low value of the color ratio.

TABLE II

*Effect of copper concentration with 0.20% $Sb_2O_4$*

| Atoms of Copper Per Mole of ZnS | Brightness (Arbitrary Units) | Current Microamperes | Color Ratio |
|---|---|---|---|
| 0.0004 | 240 | 110 | 2.65 |
| 0.0006 | 1,200 | 160 | 1.71 |
| 0.0008 | 1,400 | 190 | 1.60 |
| 0.0012 | 1,300 | 220 | 0.88 |
| 0.0016 | 1,100 | 270 | 0.73 |

Table III below gives similar results with a different concentration of antimony oxide. These phosphors were fired at 1600° F.

TABLE III

*Effect of copper concentration with 0.80% $Sb_2O_4$*

| Atoms of Copper Per Mole of ZnS | Brightness (Arbitrary Units) | Current Microamperes | Color Ratio |
|---|---|---|---|
| 0.0004 | 250 | 110 | 2.10 |
| 0.0006 | 1,000 | 150 | 1.47 |
| 0.0008 | 1,100 | 190 | 1.25 |
| 0.0012 | 1,400 | 160 | 0.86 |
| 0.0016 | 920 | 270 | 0.71 |

Table IV below shows the effect of variations in the arsenic oxide concentration used with a phosphor containing 0.0012 atoms of copper per mole of zinc sulfide for phosphors fired at 1600° F. It is apparent that only a limited range of arsenic concentrations will give good phosphors and we have found in general that the amount of arsenic oxide must be less than 0.50% and greater than about 0.01%, though the actual amount giving good phosphors depends on such variables as crucible size, firing temperature, and firing time, so that it is difficult to give precise limits for the allowable amount of arsenic oxide. For the same reason, it is difficult to give precise amounts for the lower limit of arsenic oxide permissible, but in general it is of the order of 0.01%.

TABLE IV

*Effect of arsenic oxide additions on powders containing 0.0012 atoms of copper per mole of ZnS*

| Percent by Weight of $As_2O_3$ | Brightness (Arbitrary Units) | Current Microamperes | Color Ratio |
|---|---|---|---|
| 0.00 | less than 10 | 90 | |
| 0.08 | 1,700 | 330 | 0.77 |
| 0.16 | 1,800 | 260 | 0.78 |
| 0.32 | 480 | 130 | 0.85 |
| 0.64 | 190 | 100 | 0.92 |

Table V below shows the effect of copper concentration when the second activator is arsenic. It will be seen that the results are quite similar to those obtained when the second activator is antimony.

TABLE V

*Effect of copper concentration with 0.08% $As_2O_5$*

| Atoms of Copper Per Mole of ZnS | Brightness (Arbitrary Units) | Current Microamperes | Color Ratio |
|---|---|---|---|
| 0.0008 | 1,000 | 160 | 1.23 |
| 0.0012 | 1,700 | 330 | 0.77 |
| 0.0016 | 1,700 | 400 | 0.58 |

Table VI below shows the effect of bismuth oxide additions. The allowable range of bismuth is intermediate between that of arsenic and antimony and we believe that it lies between 0.01 and 0.50% but it cannot be specified precisely because of the effect of variations in firing conditions. Bismuth also tends to give appreciably higher currents than were found when antimony or arsenic were used as the second activator. This higher current is not serious unless it is desirable to use copper contents above 0.0020 atoms per mole of ZnS.

TABLE VI

*Effect of bismuth oxide additions on powders containing 0.0012 atoms of copper per mole ZnS*

| Percent by Weight of $Bi_2O_3$ | Brightness (Arbitrary Units) | Current Microamperes | Color Ratio |
|---|---|---|---|
| 0.00 | less than 10 | 90 | |
| 0.04 | 2,000 | 690 | 0.80 |
| 0.08 | 1,900 | 850 | 0.80 |
| 0.16 | 1,800 | 920 | 0.86 |
| 0.32 | 1,700 | 960 | 1.04 |

Table VII below shows the effect of copper concentration on phosphors in which the second activator is bismuth. It will be seen that the allowable lower limit for copper is approximately 0.0005 atoms per mole. This is somewhat above that allowable with arsenic or antimony.

TABLE VII

*Effect of copper concentration with 0.08% $Bi_2O_3$*

| Atoms of Copper Per Mole of ZnS | Brightness (Arbitrary Units) | Current Microamperes | Color Ratio |
|---|---|---|---|
| 0.0004 | 13 | 90 | |
| 0.0006 | 980 | 160 | 1.73 |
| 0.0008 | 2,200 | 550 | 1.37 |
| 0.0012 | 1,900 | 850 | 0.80 |
| 0.0016 | 1,500 | 900 | 0.58 |

Table VIII below shows the effect of firing temperature on phosphors containing 0.04% bismuth trioxide. It will be seen that the temperature is somewhat critical even with 0.0012 atoms of copper and becomes more critical when the copper content is reduced. However, we have found that small variations in the amount of the second activator will overcome this temperature effect and, in general, we have found that it is possible to make good electroluminescent phosphors with firings between 1400° F. and 1850° F. with any of the three activating metals. The resultant phosphors have a crystal structure which is predominantly cubic as determined by X-ray diffraction tests. If the firing temperature is raised above 1850° F., the crystal structure becomes predominantly hexagonal and such powders do not show good electroluminescence. The prefered powders containing any copper concentration above 0.0003 atoms per mole show excellent fluorescent response and have a body color, when viewed by daylight, varying from very pale greenish-yellow to somewhat deeper yellow as the copper concentration increases.

TABLE VIII

*Effect of temperature of refiring with 0.04% $Bi_2O_3$ with two copper concentrations*

| Firing Temperature | Brightness | 0.0008 Atoms Cu Per Mole of ZnS | | 0.0012 Atoms Cu Per Mole of ZnS |
|---|---|---|---|---|
| | | Current | Brightness | Current |
| 1,400 | 420 | 130 | 1,600 | 230 |
| 1,600 | 2,200 | 550 | 2,000 | 690 |
| 1,800 | 1,700 | 340 | 1,400 | 450 |
| 2,000 | 120 | 110 | 57 | 90 |

After refiring with any of the three activating metals described in this disclosure, the body color becomes appreciably darker when the copper concentration is low and becomes much darker when the copper concentration is high, and, in fact, we have found that the physical appearance of the phosphor is a fairly good indication of its electroluminescent behavior.

This darker body color appears to be due to the precipitation on the phosphor of a surface layer which is rich in copper sulfide or some similar material. The exact mechanism by which antimony, bismuth, and arsenic cause the precipitation of this copper-rich surface is not known but the appearance of the phosphors and the increased current when the material is tested in castor oil is an indication that the conductivity of the phosphor is increased by the presence of the second metallic activator, although additional amounts of second activator may not increase the conductivity as much as smaller amounts. A zinc sulfide phosphor containing large amounts of copper together with a co-activator, such as chlorine or a trivalent element, can be converted into an electroluminescent phosphor by firing in such a way as to cause the formation of a copper-rich surface at some areas on the phosphor surface.

What we claim is:

1. An electroluminescent phosphor of cubic crystal structure comprising a fired mixture of zinc sulfide activated with between about 0.0004 and 0.005 gram-atoms of copper per mole of zinc sulfide and with a substance selected from the group consisting of antimony, arsenic and bismuth, the selected substance being present in the amount of about 0.02% to 2% if antimony, about 0.01% to 0.5% if arsenic, about 0.01% to 0.5% if bismuth, the amount being taken by weight.

2. An electroluminescent phosphor comprising zinc sulfide activated with between about 0.0004 and 0.005 gram-atoms of copper per mole of zinc sulfide and with between about 0.02% and 2% by weight of an antimony compound, the mixture having been fired at between about 1400° F. and 1850° F.

3. An electroluminescent phosphor comprising a fired mixture of zinc sulfide, a copper activating compound in an amount corresponding to between about 0.0004 and 0.005 gram-atoms of copper per mole of zinc sulfide, a co-activating halide, and between about 0.02% and 2% by weight of an antimony compound, the mixture having been fired in between about 1400° F. and 1850° F.

4. The method of making an electroluminescent phosphor, which method comprises adding to zinc sulfide activated with between about 0.0004 to 0.005 gram-atoms of copper per mole of said sulfide, a salt of a substance selected from the group consisting of arsenic, antimony and bismuth, in the amount of about 0.02% to 2% if antimony, about 0.01% to 0.5% if arsenic and about 0.01% to 0.5% if bismuth, the amount being taken by weight and firing the resultant mixture at a temperature between about 1400° F. and 1850° F.

5. An electroluminescent phosphor of cubic crystal structure comprising a fired mixture of zinc sulfide, a copper activating compound in an amount corresponding to between about 0.0004 and 0.005 gram-atoms of copper per mole of zinc sulfide, and between about 0.02% and 2% by weight of an antimony compound.

6. An electroluminescent phosphor comprising zinc sulfide activated with between about 0.0004 and 0.005 gram-atoms of copper per mole of zinc sulfide and with between about 0.01% and 0.5% by weight of a bismuth compound, the mixture having been fired at between about 1400° F. and 1850° F.

7. An electroluminescent phosphor comprising zinc sulfide activated with between about 0.0004 and 0.005 gram-atoms of copper per mole of zinc sulfide and with between about 0.01% and 0.5% by weight of an arsenic compound, the mixture having been fired at between about 1400° F. and 1850° F.

8. An electroluminescent phosphor of cubic crystal structure comprising a fired mixture of zinc sulfide, a copper activating compound in an amount corresponding to between about 0.0004 and 0.005 gram-atoms of copper per mole of zinc sulfide, and between about 0.01% and 0.5% by weight of a bismuth compound.

9. An electroluminescent phosphor of cubic crystal structure comprising a fired mixture of zinc sulfide, a copper activating compound in an amount corresponding to between about 0.0004 and 0.005 gram-atoms of copper per mole of zinc sulfide, and between about 0.01% and 0.5% by weight of an arsenic compound.

References Cited in the file of this patent

UNITED STATES PATENTS

| | | |
|---|---|---|
| 2,447,322 | Fonda | Aug. 17, 1948 |
| 2,522,074 | Urbach | Sept. 12, 1950 |

FOREIGN PATENTS

| | | |
|---|---|---|
| 873,860 | France | July 22, 1942 |